United States Patent
Stoppek

(10) Patent No.: US 6,318,242 B1
(45) Date of Patent: Nov. 20, 2001

(54) FILLED HYDRAULIC PISTON AND METHOD OF MAKING THE SAME

(75) Inventor: Robert J. Stoppek, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/426,601

(22) Filed: Oct. 26, 1999

(51) Int. Cl.⁷ ............. F01B 31/00; B23P 15/10; B21K 1/44
(52) U.S. Cl. ............ 92/184; 92/187; 29/888.042; 29/888.05
(58) Field of Search ............ 29/888.042, 888.044, 29/888.05; 92/181 R, 184, 187

(56) References Cited

U.S. PATENT DOCUMENTS

| | | |
|---|---|---|
| 3,187,644 | 6/1965 | Ricketts ............ 92/248 |
| 3,319,575 | 5/1967 | Havens . |
| 3,707,113 | 12/1972 | Hein et al. . |
| 3,741,077 | 6/1973 | Hulsebus et al. . |
| 3,882,762 | 5/1975 | Hein . |
| 3,896,707 | 7/1975 | Holmstrom . |
| 3,915,074 | 10/1975 | Bristow et al. . |
| 3,984,904 | 10/1976 | Schlecht . |
| 3,986,439 | 10/1976 | Ring . |
| 3,999,468 | 12/1976 | Bristow et al. . |
| 4,494,448 | 1/1985 | Eystratov et al. . |
| 4,519,300 | 5/1985 | Adomis, Jr. . |
| 5,007,332 | 4/1991 | Wagenseil . |
| 5,072,655 | 12/1991 | Adler ............ 92/160 |
| 5,076,148 | 12/1991 | Adler ............ 92/158 |
| 5,216,943 | 6/1993 | Adler et al. ............ 92/157 |
| 5,469,776 | * 11/1995 | Martensen et al. ............ 92/187 X |
| 5,490,446 | 2/1996 | Engel . |
| 6,006,652 | * 12/1999 | Peng ............ 92/187 X |

FOREIGN PATENT DOCUMENTS

| | | | |
|---|---|---|---|
| 1525382-A1 | * 11/1989 | (SU) | ............ 92/181 R |

* cited by examiner

*Primary Examiner*—John E. Ryznic
(74) *Attorney, Agent, or Firm*—Zarley, McKee, Thomte, Voorhees & Seas

(57) ABSTRACT

The present invention relates to a filled piston assembly for a hydraulic pump or motor. The filled hydraulic piston assembly includes a blank piston body having first and second ends and a cavity or compartment in the piston body extending inwardly from one of the ends. The piston is filled with a lightweight solid insert element which is placed into the compartment of the piston. The material of the blank piston body is then cold formed around the insert element to encapsulate the element. The piston body is then further cold rolled to receive a spherical ball in one end. It is then cut to length, machine finished, and a longitudinal center bore is drilled therein.

7 Claims, 4 Drawing Sheets

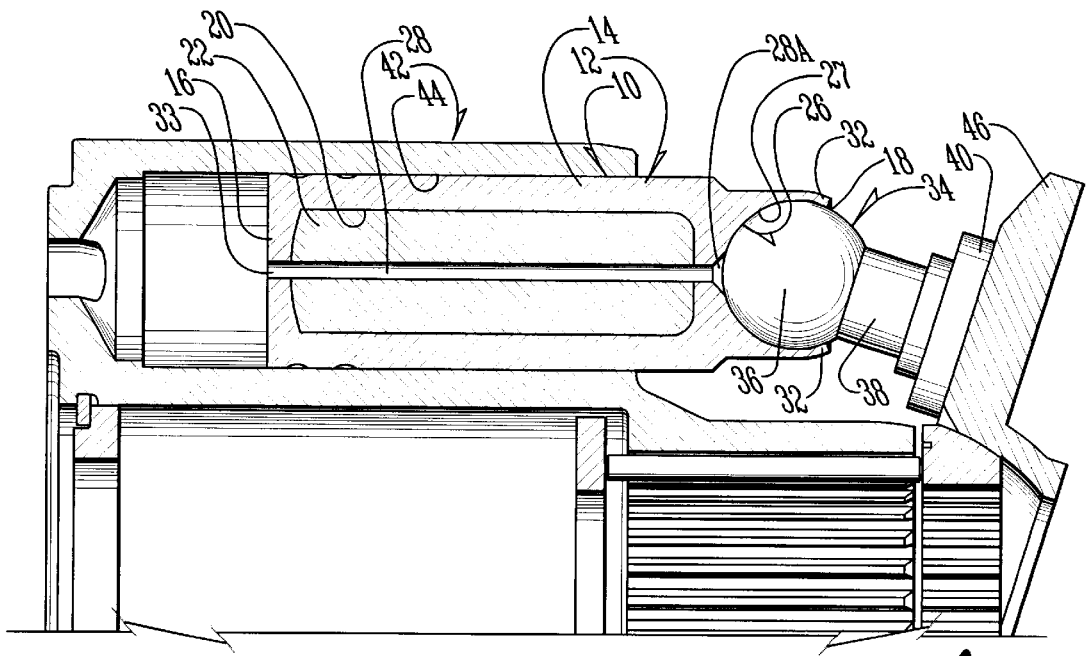
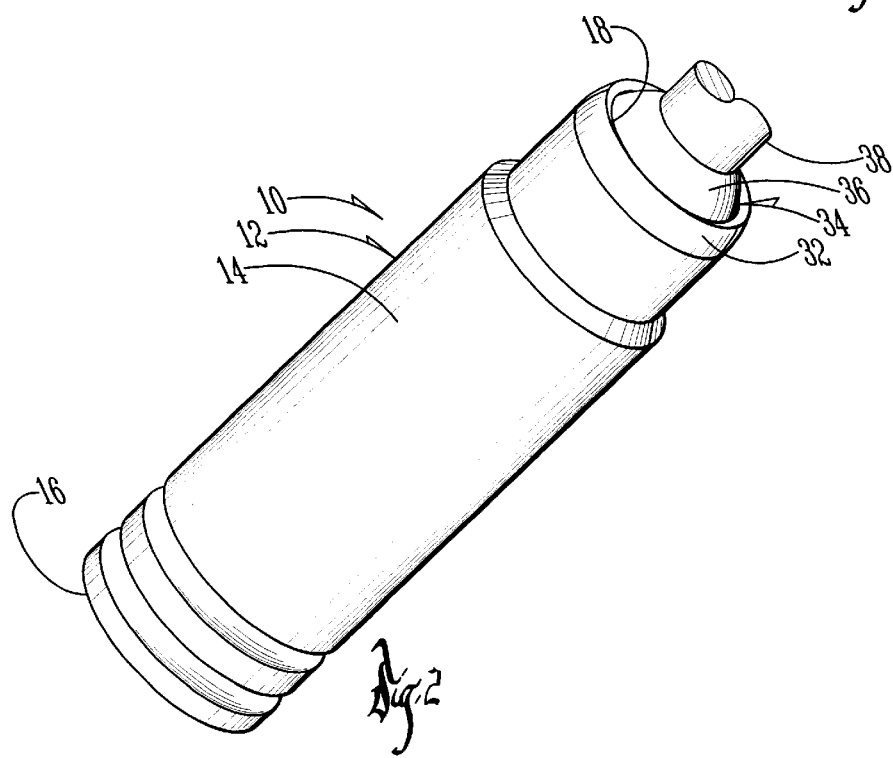

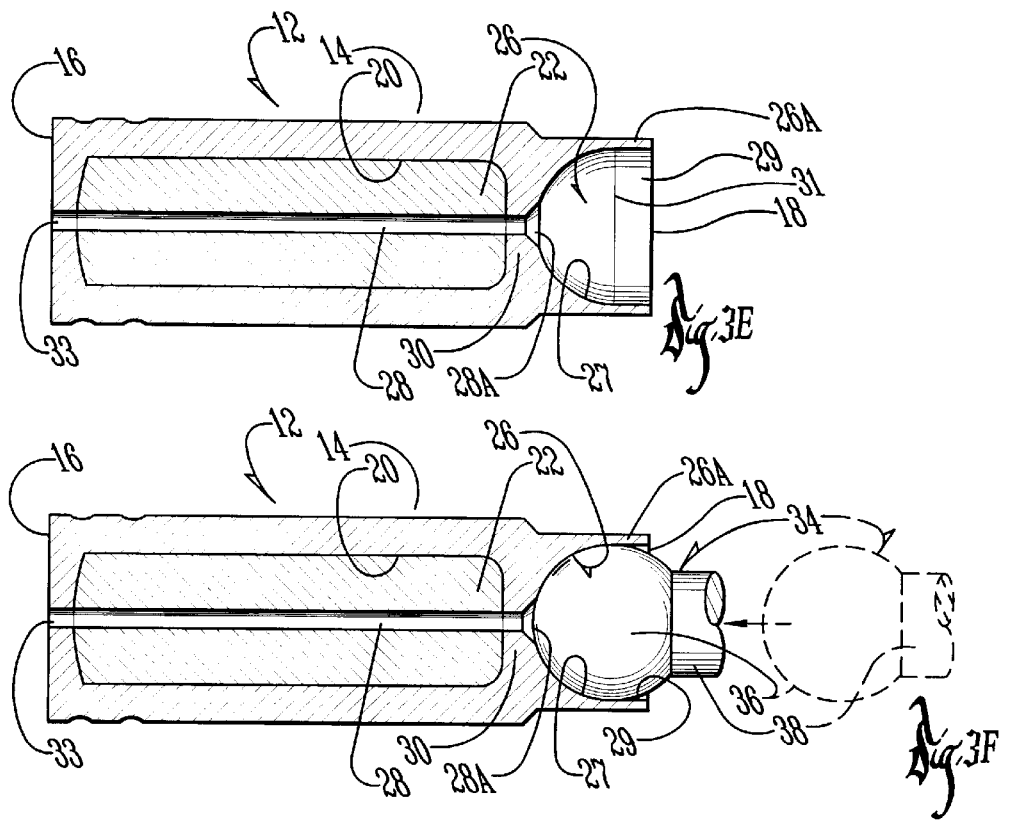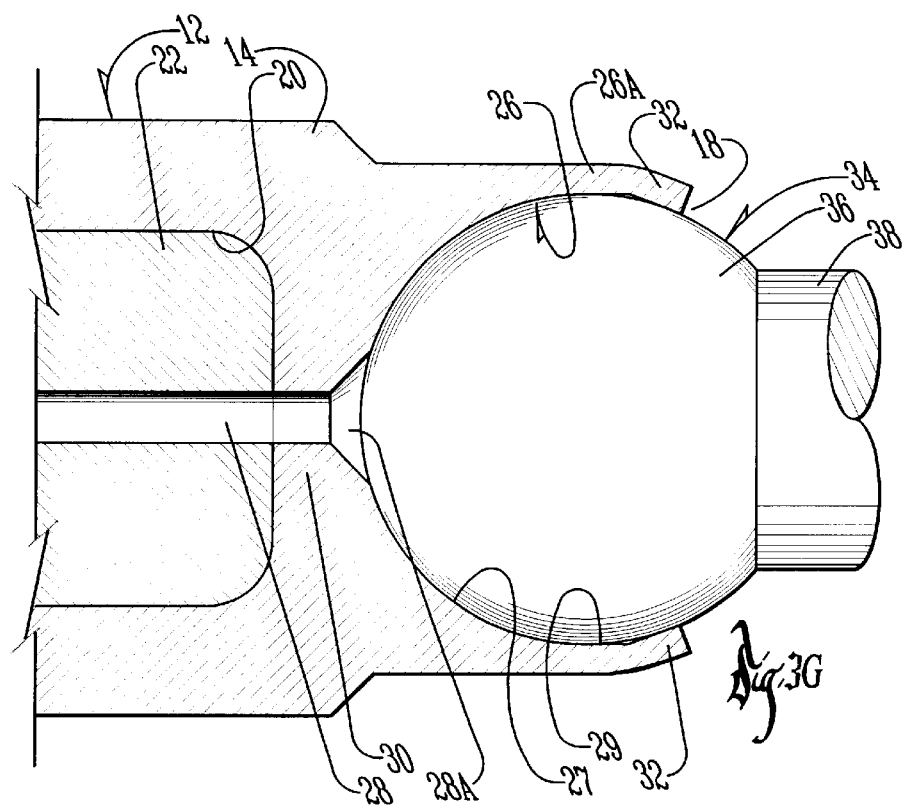

FILLED HYDRAULIC PISTON AND METHOD OF MAKING THE SAME

BACKGROUND OF THE INVENTION

The present invention relates to pistons for hydraulic pumps and motors. More particularly, this invention relates to a filling for hydraulic pistons used in pumps and motors. The filled piston of this invention increases the efficiency of the pump or motor at a reasonable cost.

A known technique for reducing the amount of oil that is contained within a hydraulic piston is to fill the normally hollow piston with a solid material. This reduces the amount of oil contained within the piston. The oil within the piston must be compressed during each revolution or pumping cycle.

Hollow piston constructions have been found to produce adverse side effects due mainly to the compressibility of the oil which fills the piston cavity. The compressibility of the fluid has a marked effect upon the overall efficiency of the unit, and also produces cavitation, erosion, noise and undesirable moments on the swashplate mechanism when used in an axial piston type of pump or motor.

There are currently at least three known types of "filled" hollow pistons: welded pistons, solid pistons, and plastic-filled pistons. Welded pistons are costly to manufacture because of the welding process. Welded pistons also require that a drilled orifice be provided through the unit for lubrication of the slipper running face. These drilled holes are usually relatively long and small in diameter. Therefore, the drilling process is typically quite difficult and expensive.

Solid pistons also reduce the oil volume. However, solid pistons are much heavier than their hollow counterparts and therefore reduce the speed capability of the hydraulic unit. Similar to welded pistons, solid pistons have a small hole therethrough which requires an expensive drilling operation to ensure lubrication for the slipper running face.

Filling the pistons by pouring a liquid plastic material into them has also been tried. When solidified, the plastic has a bulk modulus greater than that of oil. This method has proven to be costly, and it has been difficult to reliably retain the material within the piston or adhere it to the piston wall. Many plastics do not meet the bulk modulus requirement.

The oil volume in each piston bore is compressed to the operating pressure during each rotation of the cylinder block. Oil is compressible and takes energy to compress. This results in energy losses for units that do not have the piston filled. Providing this reduced volume can improve the efficiency but usually requires a higher cost to produce.

Another problem with the hollow pistons is the variation in control moments with changes in block rotational speed. Direct displacement (non servo) units typically do not have pistons with reduced volume because of the higher cost. Since direct displacement units do not have a servo to control the swashplate, the operator feels the control moments.

Pistons with low volume can be manufactured as welded pistons or as solid pistons. Both achieve the performance improvements but the welded is costly to produce and the solid pistons are much heavier which reduces the maximum speed at which they can operate due to higher block tipping forces and higher centrifugal forces causing piston burn.

It has been difficult to adapt the conventional "filled" pistons described above to lower-pressure hydraulic units. Thus, the lower-pressure hydraulic units do not get the benefit of the reduced oil volume because they are typically lower-cost units, and the market will not tolerate the additional cost of the non-hollow pistons.

Therefore, a principal object of the invention is to provide a lightweight insert in the piston retained by cold forming the piston material around the insert.

A further objective of the invention is the provision of a lightweight piston filling which can be produced without expensive casting or extrusion methods.

A further objective of the invention is to provide a lightweight piston which is low cost and which reduces oil compressibility.

These and other objectives will be apparent to those skilled in the art.

SUMMARY OF THE INVENTION

The present invention relates to a filled piston assembly for a hydraulic pump or motor. The filled hydraulic piston assembly includes a blank piston body having first and second ends and a cavity or compartment in the piston body extending inwardly from one of the ends. The piston is filled with a lightweight solid insert element which is placed into the compartment of the piston. The material of the blank piston body is then cold formed around the insert element to encapsulate the element. The piston body is then further cold rolled to receive a spherical ball in one end. It is then cut to length, machine finished, and a longitudinal center bore is drilled therein.

BRIEF DESCRIPTION OF THE DRAWINGS

FIG. 1 is a cross-sectional view of the filled piston of this invention installed in the cylinder block of a hydraulic unit.

FIG. 2 is an enlarged scale perspective view of the filled piston assembly.

FIGS. 3A–3G show the respective method steps of creating and assembling the fitted piston of this invention.

DETAILED DESCRIPTION OF THE PREFERRED EMBODIMENTS

Figure 3A:
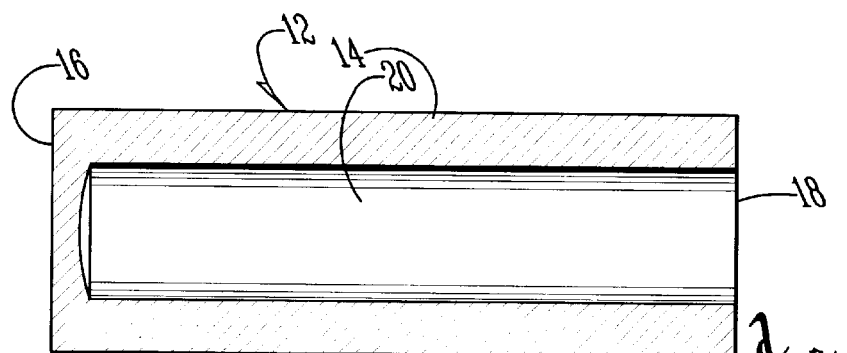

The filled and assembled hydraulic piston assembly of this invention is generally designated by the reference numeral 10 (FIG. 1) in the figures. The piston assembly 10 includes a blank metal piston body 12 which has a cylindrical wall 14, a closed end 16, an open end 18 and a center bore 20. The creation of the assembly 10 involves placing a cylindrically-shaped aluminum slug 22 in bore 20. Slug 22 has a diameter complimentary and substantially equal to the diameter of bore 20, but the slug 22 has a shorter length, leaving an open space 24 in bore 20 adjacent the open end 18 (FIG. 3B).

Figure 3B:
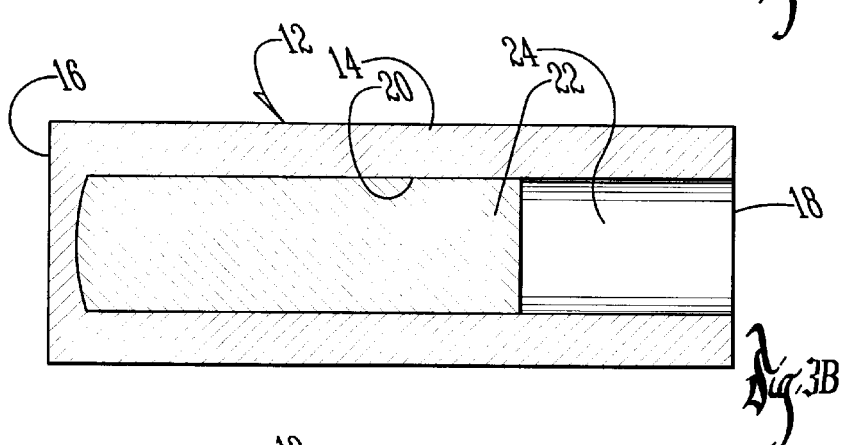
Figure 3C:
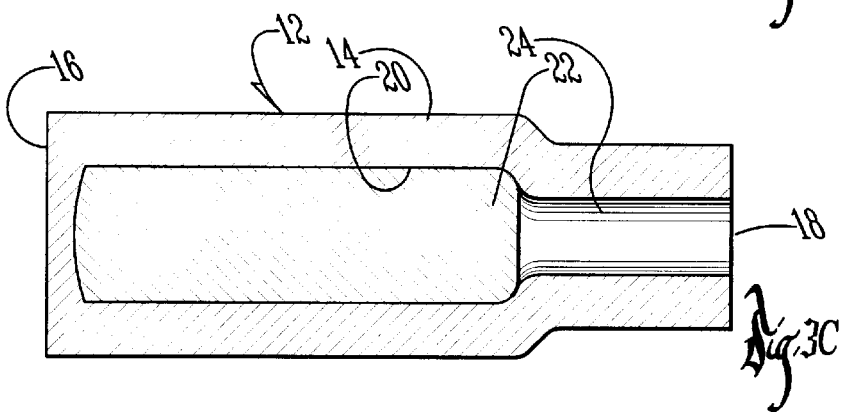

As shown in FIG. 3C, the sub-assembly of FIG. 3B is cold rolled to compress the body 12 around space 24 and to bind the slug 22 in the bore 22 against the closed end 16. This step forms a reduced interior and exterior diameters for the forward end 18 of the body 12 as shown in FIG. 3C.

Figure 3D:
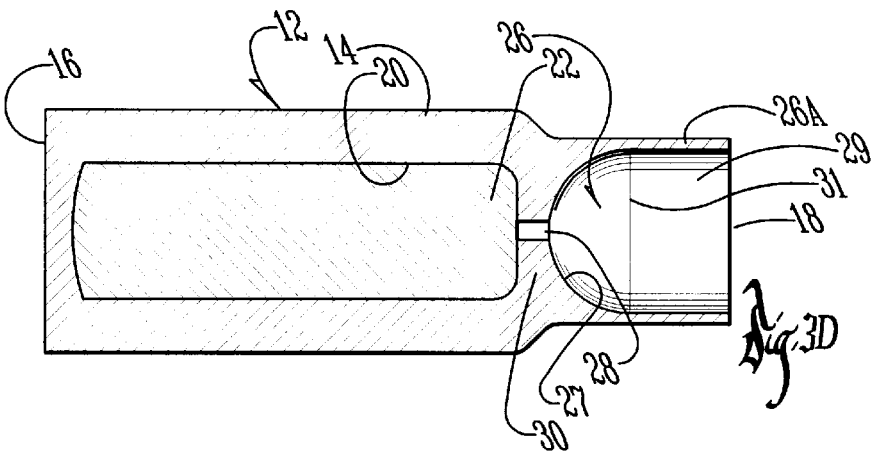
Figure 4:
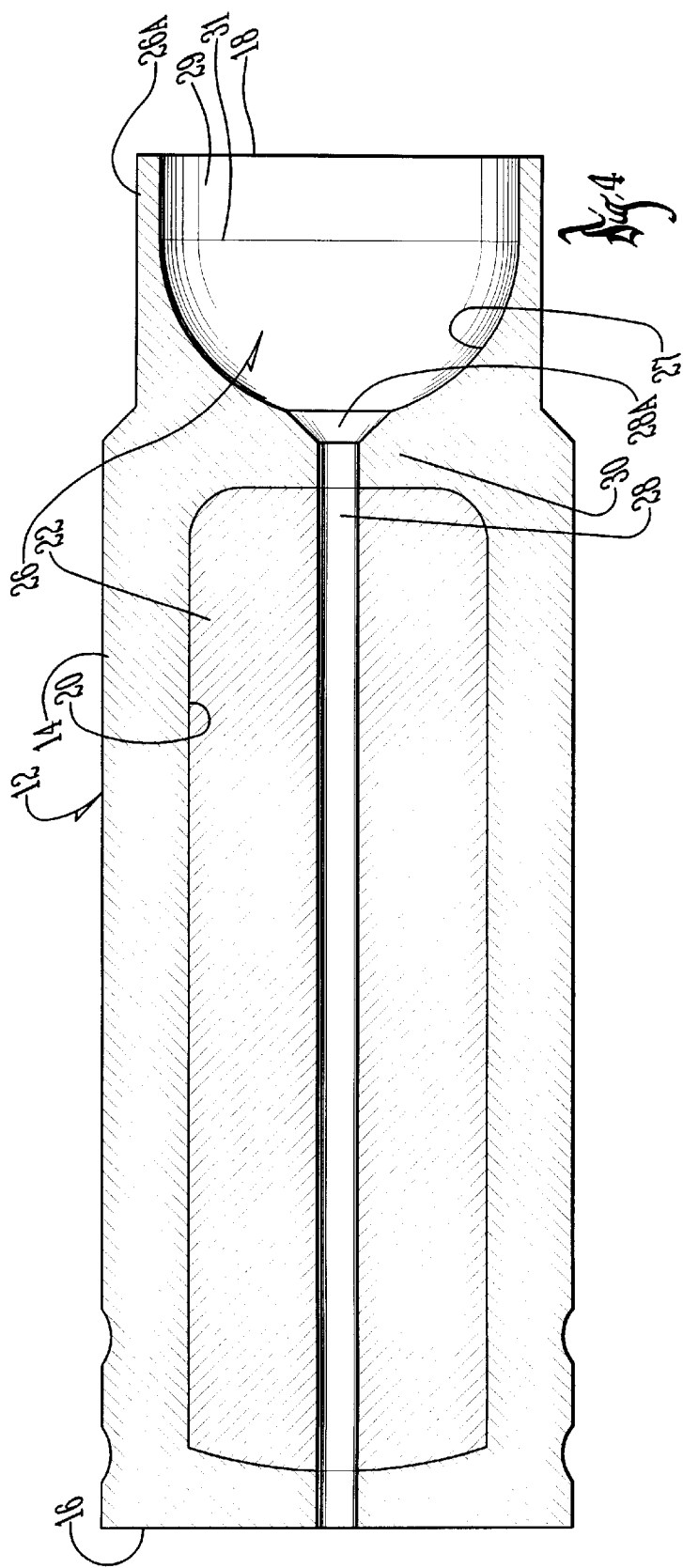
FIG. 4 is a large scale longitudinal sectional view of the filled piston similar to FIG. 3D.

The assembly of FIG. 3C is then subjected to cold forming as shown in FIG. 3D, where the forward end 18 of body 12 and the space 24 at the forward end of bore 20 are again subjected to a cold form treatment to create socket 26 which is spherical in shape at its rearward socket end 27 and terminates on its rearward axis on top hole 28 which is formed in closure wall 30. Wall 30 completely encapsulates slug 22. The forward end 29 of socket 26 has relatively thin cylindrical wall 26A which extends from the spherical shaped socket end 27 to end 18 of body 12. The line 31 denotes the intersection between socket end 27 and the end 29 of socket 26 (FIG. 3D).

The assembly resulting from step D of FIG. 2 is then cut to length by reducing the length of wall 26A to form an annular lip 32 at end 18. Lip 32 extends beyond line 31 and thus dwells forwardly from a vertical plane passing through line 31 which defines the shape of socket end 27 as half-spherical. A hole 33 is drilled from top hole 28 axially along the center axis of slug 22 and the closed end 16 of body member 14. The top hole 28 is then formed into a funnel shaped chamfered compartment 28A (FIG. 3G).

The numeral 34 designates a slipper which has a ball or sphere 36 at one end from which a short reduced diameter stem 38 extends (FIGS. 1 and 3G). A slipper plate 40 is on the end of stem 38 opposite to sphere 36. As shown in FIGS. 1, 3F and 3G, the sphere 36 is moved into socket 26 with end 27 which is complimentary in shape to the sphere, and which encompasses half of the surface thereof. Then, the lip 32 is compressed onto the surface portion of sphere 36 that extends beyond the outer end of socket end 27. (FIG. 3G). The compression of sphere 36 by lip 32 is such that the sphere 36 is rotatable within socket end 27.

The assembled piston assembly 10 is suitable for use in a conventional cylinder block 42 (FIG. 1) which includes piston assembly 10 slidably mounted in piston bore 44. Slipper plate 40 is in engagement with conventional swashplate 46. Oil is conventionally supplied to the bottom of bore 44 and communicates with socket 26 and socket end 27 via bore 33 and the chamfered compartment 28A.

From the foregoing, it is seen that this invention will achieve at least its stated objectives.

What is claimed is:

1. A method of making a hydraulic piston for a rotating hydraulic pump or motor, comprising, cold forming a blank metal piston body to create a hollow cylindrical body with a closed end, an open end, and a center bore of uniform cross section, placing a metal insert slug into the center bore which has a complimentary cross-section to that of the center bore and having an interior end adjacent the closed end of the center bore and an outer end spaced inwardly from the open end of the center bore to leave open an outer end portion of the center bore, with the insert slug being of a material less dense than that of the material of the piston body, cold rolling the open end of the piston body to deform the piston body around the outer end portion of the center bore to decrease the diameter of the outer end portion of the center bore and to partially encompass the outer end of the insert slug, cold forming a partial spherical-shaped socket in the outer end portion of the center bore, and placing a spherical shaped slipper member in the socket.

2. The method of claim 1 wherein the piston body has its open end partially removed to obtain a predetermined longitudinal length of the piston body before the slipper member is placed in the socket.

3. The method of claim 1 wherein the slipper member is at least partially rotatably mounted in the socket.

4. The method of claim 1 wherein a longitudinal fluid passageway is formed in the piston body and the insert slug which communicates with the socket.

5. The method of claim 4 wherein a fluid compartment is formed in the body member at the intersection of the socket and the longitudinal fluid passageway.

6. The method of claim 1 wherein a portion of the body member covers the outer end of the insert slug when the socket is formed.

7. The method of claim 6 wherein an annular lip is crimped forwardly over a vertical plane passageway laterally through the center bore to rotatably retain the slipper in the socket.

* * * * *